United States Patent
Kaji

(10) Patent No.: US 8,036,443 B2
(45) Date of Patent: Oct. 11, 2011

(54) IMAGE PROCESSING METHOD AND IMAGE PROCESSOR

(75) Inventor: Daisuke Kaji, Tokyo (JP)

(73) Assignee: Konica Minolta Medical & Graphic, Inc. (JP)

( * ) Notice: Subject to any disclaimer, the term of this patent is extended or adjusted under 35 U.S.C. 154(b) by 984 days.

(21) Appl. No.: 11/915,695

(22) PCT Filed: May 19, 2006

(86) PCT No.: PCT/JP2006/309999
§ 371 (c)(1),
(2), (4) Date: Nov. 27, 2007

(87) PCT Pub. No.: WO2006/129497
PCT Pub. Date: Dec. 7, 2006

(65) Prior Publication Data
US 2009/0136110 A1 May 28, 2009

(30) Foreign Application Priority Data
May 31, 2005 (JP) .................................. 2005-158671

(51) Int. Cl.
*G06K 9/00* (2006.01)
*G01N 23/04* (2006.01)
(52) U.S. Cl. ........................................ 382/132; 378/62
(58) Field of Classification Search ................ 378/4, 19, 378/62; 382/128, 131.132, 285
See application file for complete search history.

(56) References Cited

U.S. PATENT DOCUMENTS

| | | | | |
|---|---|---|---|---|
| 6,950,494 | B2 * | 9/2005 | Vija et al. | 378/62 |
| 7,570,791 | B2 * | 8/2009 | Frank et al. | 382/132 |
| 2002/0176615 | A1 * | 11/2002 | Ito | 382/132 |
| 2003/0095698 | A1 * | 5/2003 | Kawano | 382/132 |

FOREIGN PATENT DOCUMENTS

| | | |
|---|---|---|
| JP | 55-12429 A | 1/1980 |
| JP | 63-189853 A | 8/1988 |

(Continued)

OTHER PUBLICATIONS

International Search Report for International Application No. PCT/JP2006/309999 mailed Sep. 12, 2006.

*Primary Examiner* — Irakli Kiknadze
(74) *Attorney, Agent, or Firm* — Cantor Colburn LLP

(57) ABSTRACT

An image processor executes an image processing under an appropriate condition. The image possessor comprises an important area detecting section (120) for detecting a bone portion or soft portion as an important area included in an X-ray image, a weight image creating section (130) for creating a weight image for imparting a predetermined weight to the pixels of the important area, histogram computing section (140) for multiplying the weight of the weight image by the pixel value of the X-ray image and computing a weighted histogram from the results of the multiplication, evaluating section (150) for evaluating the weighted histogram with a predetermined evaluation function and computing a shift value at which the evaluation result takes on a maximum value, image processing condition determining section (160) for so determining an image processing condition so as to obtain a predetermined processing result from the pixel value of the X-ray image corresponding to the maximum value of the evaluation function for obtaining a shift value, and image processing section (170) for executing an image processing under the image processing condition.

14 Claims, 10 Drawing Sheets

FOREIGN PATENT DOCUMENTS

| | | |
|---|---|---|
| JP | 6-61325 A | 3/1994 |
| JP | 6-342098 A | 12/1994 |
| JP | 7-271972 A | 10/1995 |
| JP | 9-90048 A | 4/1997 |
| JP | 10-32756 A | 2/1998 |
| JP | 11-142998 A | 5/1999 |
| JP | 2000-157518 A | 6/2000 |
| JP | 2001-238868 A | 9/2001 |
| JP | 2002-156716 A | 5/2002 |
| JP | 2005-109867 A | 4/2005 |
| JP | 2005-210384 A | 8/2005 |
| JP | 2005-294932 A | 10/2005 |
| JP | 2005-341553 A | 12/2005 |

\* cited by examiner

FIG. 8 (a)
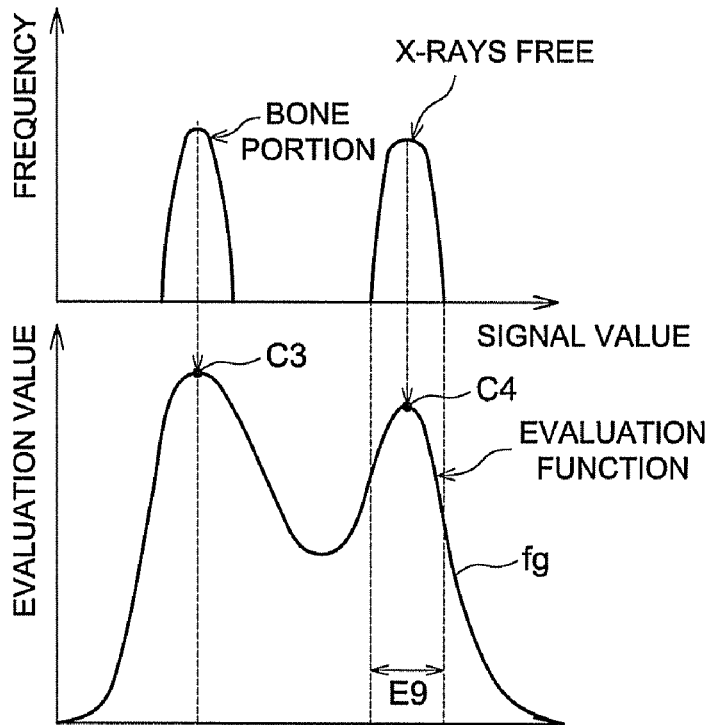
FIG. 8 (b)
FIG. 8 (c)
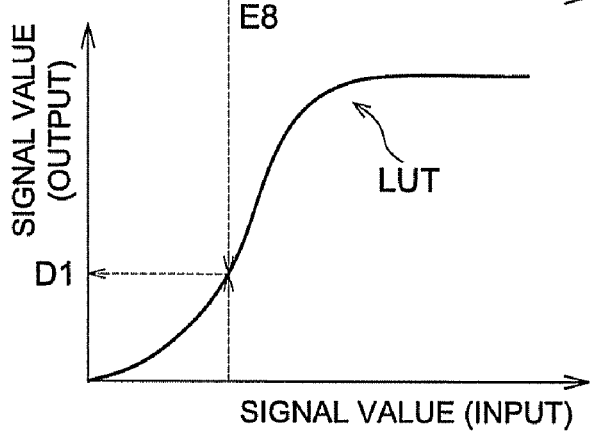

IMAGE PROCESSING METHOD AND IMAGE PROCESSOR

CROSS REFERENCE TO RELATED APPLICATIONS

This is a U.S. national stage of application No. PCT/JP2006/309999, filed on 19 May 2006. Priority under 35 U.S.C. §119(a) and 35 U.S.C. §365(b) is claimed from Japanese Application No. 2005-158671, filed 31 May 2005, the disclosure of which is also incorporated herein by reference.

FIELD OF THE INVENTION

The present invention relates to an image processing method and an image processor when processing radiation images and more particularly to an image processing method and an image processor capable of obtaining radiation images suited to diagnosis.

DESCRIPTION OF THE RELATED ART

In resent years, an apparatus for radiographing a radiation image directly as a digital image has been developed. For example, as an apparatus for detecting a radiation dosage irradiated to a subject and obtaining an formed according to the detected amount thereof as an electric signal, a method using a detector using a stimulated fluorescent substance is disclosed in Japanese Unexamined Patent Application Publication No. S55-12429, Japanese Unexamined Patent Application Publication No. S63-189853, and others.

In such an apparatus, X-rays (radiation) transmitting once a subject are irradiated to a detector fixed to a sheet substrate by coating or depositing a stimulated fluorescent substance and are absorbed by the stimulated fluorescent substance.

Thereafter, the stimulated fluorescent substance is excited by light or heat energy, thus the stimulated fluorescent substance radiates the X-ray energy accumulated by the aforementioned absorption as fluorescence, and the fluorescence is converted photoelectrically, thereby an image signal is obtained.

On the other hand, a radiation image detecting apparatus obtained by generating a charge according to the intensity of irradiated radiation in a photo conductive layer, storing the generated charge in a plurality of capacitors arranged two-dimensionally, and taking out the stored charges is proposed.

Such a radiation image detecting apparatus uses a flat panel detector (FPD). As such a kind of FPD, as described in Japanese Unexamined Patent Application Publication No. H9-90048, a one realized by combination of a fluorescent substance for emitting fluorescence according to the intensity of radiation irradiated and a photoelectric conversion element such as a photodiode or a CCD for receiving fluorescence emitted from the fluorescent substance directly or via a compact optical system and photoelectrically converting it is known.

Further, as described in Japanese Unexamined Patent Application Publication No. H6-342098, a one for converting irradiated radiation directly to a charge is known.

In these radiation image detecting apparatuses, for obtained images, so as to make them suitable for diagnosis, various image processings such as the gradation conversion processing and edge emphasizing processing are performed generally.

Further, when displaying or outputting a radiation image based on the image data obtained in this way, an image processing of obtaining a visible radiation image without suffering variations in the radiographing condition is performed.

Therefore, it is described in Patent Document 1 indicated below that a cumulative histogram of image data in a desired area of the radiation image is obtained, and then the data level on which the cumulative histogram obtains a predetermined rate is set as a reference signal value, thus the image processing is performed.

Further, it is described in Patent Document 2 indicated below that the image processing condition is set on the basis of the distribution condition of the high signal value area and low signal value area and an appropriate image processing is performed.

Furthermore, similar processings are described in Patent Documents 3 and 4 indicated below.

Patent Document 1: Japanese Unexamined Patent Application Publication No. H6-61325 (p. 1, FIG. 1)
Patent Document 2: Japanese Unexamined Patent Application Publication No. 2000-157518 (p. 1 to p. 5, FIG. 4)
Patent Document 3: Japanese Unexamined Patent Application Publication No. 2001-238868 (p. 1, FIG. 1)
Patent Document 4: Japanese Unexamined Patent Application Publication No. H7-271972 (p. 1, FIG. 1)

SUMMARY OF THE INVENTION

Problems to be Solved by the Invention

On the other hand, in a radiation image, depending on the radiographing part of a subject, the rate of the high density area (the area at a high transmission rate of radiation) to the low density area (the area at a low transmission rate of radiation) is different greatly. Further, depending on the condition of the subject, for example, the breathing condition of a patient, the density in the lung fields is different extremely.

Therefore, when obtaining a cumulative histogram of image data in a desired area such as the region of interest (ROI) of a radiation image, then setting the data level on which the cumulative histogram obtains a predetermined rate as a reference signal value, thereby performing the image processing (Japanese Unexamined Patent Application Publication No. H6-61325), depending on a difference in the rate of the high density area to the low density area, there is a fear that a visible radiation image suited to diagnosis may not be obtained.

For example, when the gradation processing is performed so as to set the reference signal value to a predetermined density, if the low density area is dominant, the reference signal value becomes a low value, so that as a whole, a high-density image is obtained and if the high density area is dominant, the reference signal value becomes a high value, so that as a whole, a low-density image is obtained.

However, for example, on the part such as the ribs, even when radiographing and diagnosing the upper rib portion (including the lung portion having many high density areas) and the lower rib portion (including the abdomen portion having few high density areas), the part necessary for diagnosis extends over both high density area and low density area and it is not preferable for diagnosis that the density of the overall image is biased on low density or high density.

Namely, conventionally, to decide parameters for the image processing, various methods are proposed, though each method is determined by uniquely given as a signal value of the specific area (the region of interest (ROI), etc.) in an image, a signal value decided from a histogram, or a parameter, so that when the obtained area or parameter is inappropriate, the image becomes inappropriate for diagnosis, and readjustment may be required.

Namely, in the prior art, for each subject or each part of the subject, it is necessary to set an exclusive processing and an exclusive region of interest and the prior art suffers in the processing expansionism. For example, when the image processing parameter such as part information is incorrect, the image is affected by it, thus a problem arises that the image is inappropriate for diagnosis.

Further, when automatically recognizing the region of interest in an image, the finishing density (the density after processing) of the diagnosed part greatly depends on the recognition precision of the region of interest, thus when incorrect recognition is made, the image cannot be used for diagnosis, thus readjustment may be required.

Generally, in comparatively large-scale facilities, an exclusive person in charge of image processing is stationed, and the concerned responsible person checks each radiation image created by a computed radiography (CR) apparatus or an FPD for conformity to a fixed image quality or not, that is, availability to diagnosis or not. Therefore, a system that, even if a defective image quality due to defective setting is caused, the correction processings of density and contrast are performed so as to obtain the aforementioned fixed image quality, and then the image is offered to video check (diagnosis) which is a next step is adopted.

On the other hand, in small-scale facilities such as a medical practitioner or a clinic, one doctor himself often performs all of a medical examination by interview, setting of radiographing conditions, image processing, and diagnosis (video check) and when a defective image quality (an image unusable for diagnosis) due to defective setting and defective automatic part recognition is caused, performance of correction processings on the same level as that by the exclusive person in charge of image process in the aforementioned large-scale facilities cannot be expected.

Therefore, as an image processing suitable for small-scale facilities having no exclusive person in charge of image processing, rather than a processing which can offer a high-quality image for diagnosis, but has a high probability of performance of a re-processing due to an occurrence of a defective image quality, an image processing of high robustness which offers a moderate quality, but requires no re-processing is preferable.

The present invention was developed with the foregoing problems in view and is intended to realize an image processing method and an image processor for preventing the robustness in the region of interest setting system from lowering and performing an image processing under an appropriate condition.

Means for Solving the Problems

Namely, the aforementioned problems are solved by the inventions enumerated below.

The invention stated in Claim 1 is an image processing method for performing an image processing for obtaining an image suited to diagnosis for a radiation image having a signal according to the irradiation dose of radiation transmitting a subject, comprising an important area detecting step of detecting a bone portion or a soft tissue portion included in the radiation image as an important area, a weight image creating step of creating a weight image for imparting a predetermined weight to the pixels of the important area, a histogram computing step of multiplying the weight of the weight image by the pixel value of the radiation image and computing a weighted histogram from the results of multiplication, an evaluating step of evaluating the weighted histogram with a predetermined evaluation function and computing a shift value at which the evaluation result takes on a maximum value, an image processing condition determining step of determining an image processing condition so as to obtain a predetermined processing result from the pixel value of the radiation image corresponding to the maximum value of the evaluation function for obtaining the shift value, and an image processing step of executing the image processing under the image processing condition.

The invention stated in Claim 2 is an image processing method stated in Claim 1, wherein the image processing step is a gradation processing.

The invention stated in Claim 3 is an image processing method stated in Claim 1 or 2, wherein the maximum value of the evaluation characteristic of the evaluation function is within the range of the pixel value of the bone portion included in the radiation image.

The invention stated in Claim 4 is an image processing method stated in Claim 1 or 2, wherein the maximum value of the evaluation characteristic of the evaluation function is within the range of the pixel value of the bone portion included in the radiation image and the part of the evaluation characteristic which is another peak thereof is at a pixel value larger than the pixel value of the bone portion.

The invention stated in Claim 5 is an image processing method stated in Claim 1 or 2, wherein the maximum value of the evaluation characteristic of the evaluation function is within the range of the pixel value of the bone portion included in the radiation image and compared with the area in the neighborhood of the pixel value which is a maximum value of the evaluation characteristic, having a pixel value larger than the concerned pixel value, in the area in the neighborhood of the pixel value which is a maximum value of the evaluation characteristic, having a pixel value smaller than the concerned pixel value, the aforementioned evaluation characteristic has a gentle slope.

The invention stated in Claim 6 is an image processing method stated in Claim 1 or 2, wherein the maximum value of the evaluation characteristic of the evaluation function is within the range of the pixel value of the bone portion included in the radiation image, and the part of the evaluation characteristic which is another peak thereof is at a pixel value larger than the pixel value of the bone portion, and compared with the area in the neighborhood of the pixel value which is a maximum value of the evaluation characteristic, having a pixel value larger than the concerned pixel value, in the area in the neighborhood of the pixel value which is a maximum value of the evaluation characteristic, having a pixel value smaller than the concerned pixel value, the aforementioned evaluation characteristic has a gentle slope.

The invention stated in Claim 7 is an image processing method stated in Claim 1 or 2, wherein the maximum value of the evaluation characteristic of the evaluation function is within the range of the pixel value of the soft tissue portion included in the radiation image.

The invention stated in Claim 8 is an image processor for performing an image processing for obtaining an image suited to diagnosis for a radiation image having a signal according to the irradiation dose of radiation transmitting a subject, comprising an important area detecting section for detecting a bone portion or a soft tissue portion included in the radiation image as an important area, a weight image creating section for creating a weight image for imparting a predetermined weight to the pixels of the important area, a histogram computing section for multiplying the weight of the weight image by the pixel value of the radiation image and computing a weighted histogram from the results of multiplication, an evaluating section for evaluating the weighted histogram with a predetermined evaluation function and computing a shift value at which the evaluation result takes on a maximum value, an image processing condition determining section for determining an image processing condition so as to obtain a predetermined processing result from the pixel value of the radiation image corresponding to the maximum value of the evaluation function for obtaining the shift value, and an image processing section for executing the image processing under the image processing condition.

The invention stated in Claim 9 is an image processor stated in Claim 9, wherein the image processing section executes a gradation processing as an image processing.

The invention stated in Claim 10 is an image processor stated in Claim 8 or 9, wherein the maximum value of the evaluation characteristic of the evaluation function is within the range of the pixel value of the bone portion included in the radiation image.

The invention stated in Claim 11 is an image processor stated in Claim 8 or 9, wherein the maximum value of the evaluation characteristic of the evaluation function is within the range of the pixel value of the bone portion included in the radiation image and the part of the evaluation characteristic which is another peak thereof has a pixel value larger than the pixel value of the bone portion.

The invention stated in Claim 12 is an image processor stated in Claim 8 or 9, wherein the maximum value of the evaluation characteristic of the evaluation function is within the range of the pixel value of the bone portion included in the radiation image and compared with the area in the neighborhood of the pixel value which is a maximum value of the evaluation characteristic, having a pixel value larger than the concerned pixel value, in the area in the neighborhood of the pixel value which is a maximum value of the evaluation characteristic, having a pixel value smaller than the concerned pixel value, the aforementioned evaluation characteristic has a gentle slope.

The invention stated in Claim 13 is an image processor stated in Claim 8 or 9, wherein the maximum value of the evaluation characteristic of the evaluation function is within the range of the pixel value of the bone portion included in the radiation image, and the part of the evaluation characteristic which is another peak thereof has a pixel value larger than the pixel value of the bone portion, and compared with the area in the neighborhood of the pixel value which is a maximum value of the evaluation characteristic, having a pixel value larger than the concerned pixel value, in the area in the neighborhood of the pixel value which is a maximum value of the evaluation characteristic, having a pixel value smaller than the concerned pixel value, the aforementioned evaluation characteristic has a gentle slope.

The invention stated in Claim 14 is an image processor stated in Claim 8 or 9, wherein the maximum value of the evaluation characteristic of the evaluation function is within the range of the pixel value of the soft tissue portion included in the radiation image.

Effects of the Invention

The present invention, when performing an image processing for obtaining an image suited to diagnosis for a radiation image having a signal according to the irradiation dose of radiation transmitting a subject, detects a bone portion or a soft tissue portion included in the radiation image as an important area, creates a weight image for imparting a predetermined weight to the pixels of the important area, multiplies the weight of the weight image by the pixel value of the radiation image and computing a weighted histogram, evaluates the weighted histogram with a predetermined evaluation function, computes a shift value at which the evaluation result takes on a maximum value, determines an image processing condition so as to obtain a predetermined processing result from the pixel value of the radiation image corresponding to the maximum value of the evaluation function for obtaining the shift value, and executes the image processing under the image processing condition.

Here, the image processing is a gradation processing. Further, the maximum value of the evaluation characteristic of the evaluation function is within the range of the pixel value of the bone portion included in the radiation image.

Further, here, the maximum value of the evaluation characteristic of the evaluation function is within the range of the pixel value of the bone portion included in the radiation image and the part of the evaluation characteristic which is another peak thereof has a pixel value larger than the pixel value of the bone portion. Or, the maximum value of the evaluation characteristic of the evaluation function is within the range of the pixel value of the bone portion included in the radiation image and compared with the area in the neighborhood of the pixel value which is a maximum value of the evaluation characteristic, having a pixel value larger than the concerned pixel value, in the area in the neighborhood of the pixel value which is a maximum value of the evaluation characteristic, having a pixel value smaller than the concerned pixel value, the evaluation characteristic has a gentle slope. Or, the maximum value of the evaluation characteristic of the evaluation function is within the range of the pixel value of the bone portion included in the radiation image, and the part of the evaluation characteristic which is another peak thereof has a pixel value larger than the pixel value of the bone portion, and compared with the area in the neighborhood of the pixel value which is a maximum value of the evaluation characteristic, having a pixel value larger than the concerned pixel value, in the area in the neighborhood of the pixel value which is a maximum value of the evaluation characteristic, having a pixel value smaller than the concerned pixel value, the evaluation characteristic has a gentle slope.

As mentioned above, a predetermined weight is imparted to the pixels in the important area included in the radiation image, thus a weighted histogram is computed, and a shift value at which the evaluation result obtained by evaluating the weighted histogram with a predetermined evaluation function is maximized is computed, and an image processing condition is determined so as to obtain a predetermined processing result from the pixel value of the radiation image corresponding to the maximum value of the evaluation function for obtaining such a shift value, so that the predetermined processing result is obtained in the important area, and there is no need to set an exclusive region of interest (ROI) in the region of interest setting system, and an image processing having high robustness under appropriate conditions can be executed.

BRIEF DESCRIPTION OF THE DRAWINGS

FIGS. 8(a) to 8(c) are illustrations showing the situation of the processing of the embodiment of the present invention.

DESCRIPTION OF NUMERALS

| | |
|---|---|
| 5 | Subject |
| 30 | X-ray generator |
| 40 | X-ray image reader |
| 100 | Image processor |
| 101 | Control section |
| 110 | Image data creating section |
| 120 | Important area detecting section |
| 130 | Weight image creating section |
| 140 | Histogram computing section |
| 150 | Evaluating section |
| 160 | Image processing condition determining section |
| 170 | Image processing section |

DESCRIPTION OF THE PREFERRED EMBODIMENTS

Hereinafter, the preferred embodiments of the present invention will be explained in detail with reference to the accompanying drawings.

The preferred embodiments of the image processing method and image processor of the present invention will be explained. Further, the present invention is not limited to them.

Figure 1:
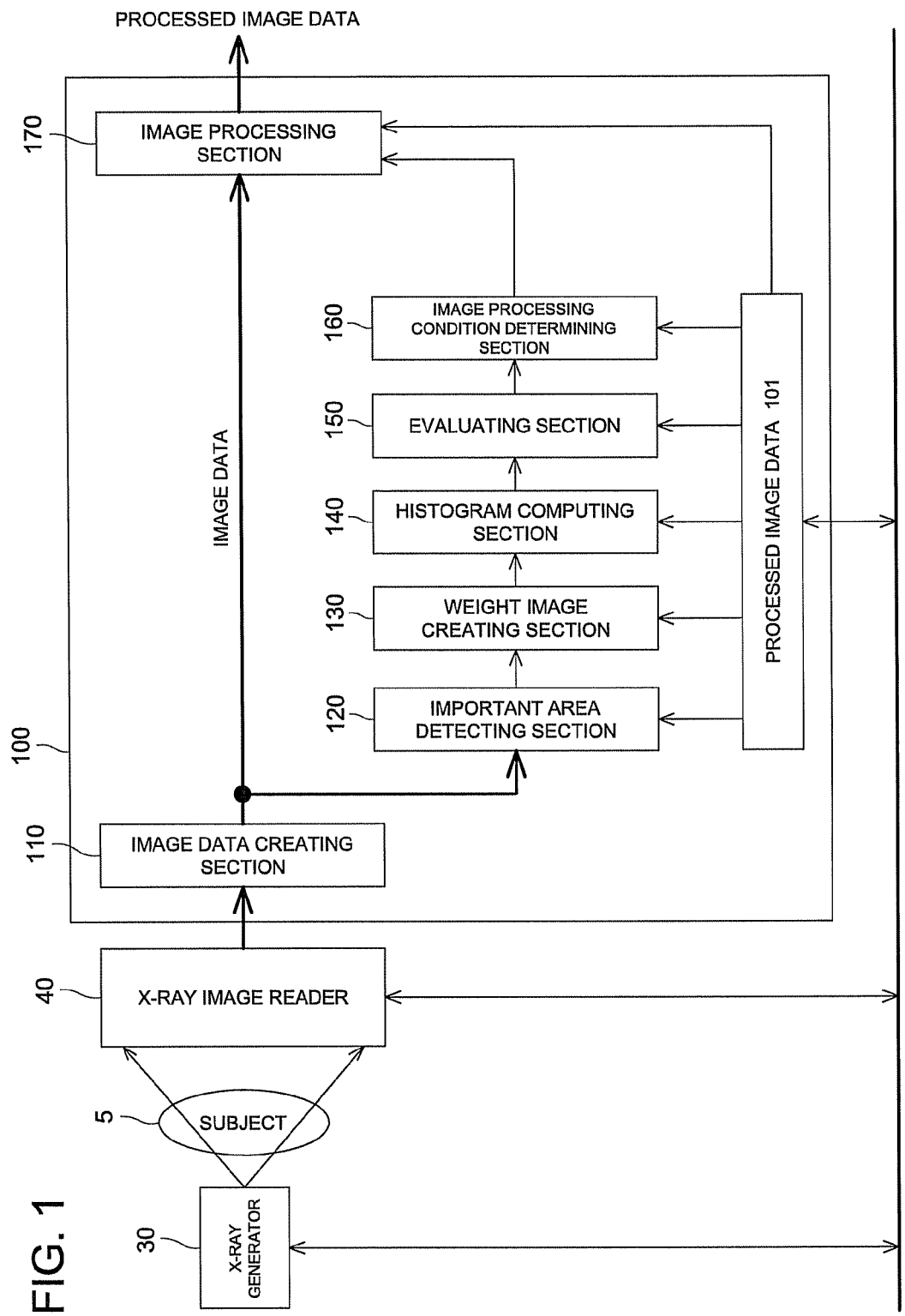
FIG. 1 is a functional block diagram showing functionally the entire constitution of an embodiment of the present invention.

Further, each section of the embodiments can be composed of hardware, firmware, or software. Therefore, as a functional block diagram according to the processing procedure of each step of the image processing method and each section of the image processor, FIG. 1 is shown.

Hereinafter, the constitution and operation of the embodiments will be explained in detail by referring to the block diagram shown in FIG. 1, the flow chart shown in FIG. 2, and other illustrations. Further, each section and each part shown in FIG. 1 indicate not only each section and each part of the image processor but also each step of the image processing method.

First Embodiment

Entire Constitution and Processing Flow

Entire Constitution of System

The X-ray generator (radiation generator) 30, X-ray image (radiation image) reader 40, and image processor 100 are structured as shown in FIG. 1.

Further, inside the image processor 100, the control section 101 composing the control section, the image data creating section 110 for creating image data, an important area detecting section (important area detecting section) 120 for detecting a bone portion or a soft tissue portion included in the image data as an important area, a weight image creating section (weight image creating section) 130 for creating a weight image for imparting a predetermined weight to the pixels of the important area, a histogram computing section (histogram computing section) 140 for multiplying the weight of the weight image by the pixel value of the radiation image and computing a weighted histogram from the results of multiplication, an evaluating section (evaluating section) 150 for evaluating the weighted histogram with a predetermined evaluation function and computing a shift value at which the evaluation result takes on a maximum value, an image processing condition determining section (image processing condition determining section) 160 for determining an image processing condition so as to obtain a predetermined processing result from the pixel value of the radiation image corresponding to the maximum value of the evaluation function for obtaining the shift value, and an image processing section (image processing section) 170 for executing the image processing under the image processing condition are structured as shown in FIG. 1.

Flow of Processing

The flow of the processing executed by the image processing system shown in FIG. 1 will be explained by referring to FIG. 2. Regarding the processing, the case of promoting the processing on the basis of the bone portion as an important area will be explained as a concrete example.

(1) The control section 101 controls radiographing and reading of a radiation image and various processings accompanying the image processing (not drawn).

(2) radiation from the X-ray generator 30 transmit the subject 5 and the radiation transmitting the subject 5 are read by the radiation image reader 40. A signal read by the radiation image reader 40 is converted to image data by the image data creating section 110 (Step S1).

(3) The important area detecting section 120 detects the bone portion as an important area by the bone portion edge included in the image data (Step S2).

(4) The weight image creating section 130 performs the binary coding process for the image data including the bone portion detected and creates a weight image at a predetermined weight, for example, a pixel value of 1 of the bone portion and a pixel value of 0 of other than the bone portion (Step S3).

(5) The histogram computing section 140, for each pixel, multiplies the weight of the weight image by the pixel value of the radiation image and then computes a weighted histogram from the results of multiplication (Step S4).

(6) The evaluating section 150 evaluates the weighted histogram with a predetermined evaluation function (specially small value evaluation function), obtains an evaluation result, and computing a shift value (S value) at which the evaluation result is maximized (Step S5).

(7) The image processing condition determining section 160 determines an image processing condition of the gradation processing so as to obtain a predetermined processing result from the pixel value of the image data corresponding to the maximum value of the evaluation function for obtaining the aforementioned shift value. Here, when the image processing is a gradation processing, an LUT for the gradation processing is determined according to the determined image processing condition (Step S6). Further, when the image processing is another processing, the image processing condition determining section 160 determines an image processing condition in accordance with the processing.

(8) The image processor 170, when the image processing condition and gradation processing are determined, executes the image processing on the basis of the LUT (Step S7).

Detailed Contents of Each Section, Each Step, and Each Routine

Hereinafter, the detailed processing procedures and contents of each section, each step, and each routine will be explained.

Radiographing and X-Ray Image (Radiation Image) Input

It is possible firstly for the control section 101 to obtain information on the radiographing part and radiographing direction from the user interface. The information is obtained by identifying the radiographing part by a user. For example, it is possible to input it from the user interface (not drawn) of the image processor 100 including both display section and touch panel by pressing the button with the radiographing part displayed or to designate whether or not to detect the bone portion or soft tissue portion as an important area. It is executed by using a magnetic card, a bar code, or an HIS (intra-hospital information system: information management by a network).

The X-ray generator 30 transmits or receives various data to or from the control section 101 in the image processor 100. Further, there are cases that the X-ray generator 30 is controlled by the control section 101 and a control section (not drawn) in the X-ray generator 30 and the control section 101 in the image processor 100 communicate with each other.

The X-rays radiated from the X-ray generator 30 are irradiated to the radiographing panel mounted in front of the radiation image reader 40 via the subject 5. And, the radiation image reader 40 detects the radiation transmitting the subject 5 and obtains an image signal.

As a concrete constitution example, as a one using a stimulated fluorescent substance plate, there are ones described in Japanese Unexamined Patent Application Publication No. H11-142998 and Japanese Unexamined Patent Application Publication No. 2002-156716. Further, as a one using a flat panel detector (FPD) as an input device, there are a one described in Japanese Unexamined Patent Application Publication No. H6-342098 for converting detected radiation directly to a charge and obtaining an image signal and a one of an indirect system described in Japanese Unexamined Patent Application Publication No. H9-90048 for converting detected radiation once to light, then receiving the light, and converting it to a charge.

Further, the radiation image reader 40 may irradiate light to a silver salt film recording a radiation image from a light source such as a laser or a fluorescent lamp, photoelectrically convert the transmitted light through the silver salt film, thereby create image data. Further, a constitution of converting radiation energy directly to an electric signal using a radiation quantum counter detector, thereby creating image data may be used.

When obtaining a radiation image of the subject 5, the subject 5 is positioned between the X-ray generator 30 and the radiographing panel of the radiation image reader 40, and the radiation radiated from the X-ray generator 30 are irradiated to the subject 50, and the radiation transmitted the subject 5 enter the radiographing panel.

And, the image signal read by the radiation image reader 40 is sent to the image date creating section 110 and is converted to image data of a predetermined number of pixels and a predetermined number of gradation bits by the image data creating section 110.

(2) Detection of Important Area

The important area detecting processing executed at Step S2 shown in FIG. 2 will be explained below.

The important area detecting section 120, when the important area is a bone portion, by various image processings for executing skeleton formation such as the top hat processing and skeleton processing, detects the bone portion as an important area from the bone portion edge included in the image data.

In this case, in addition to the top hat processing and skeleton processing, the edge detecting method using a Laplacian filter or a sobel filter can be used.

Further, when the important area is a soft tissue portion, firstly, the edge at the end of an image is detected, thus the irradiation field is recognized, thereafter, a radiation-free area is extracted by binary coding and discrimination analysis, and by the image processing of removing the bone portion area extracted as mentioned above from the residual area, the soft tissue portion included in the image data is detected as an important area.

Further, when a plurality of methods are used, the results by the plurality of methods are joined according to a certain weight. In this case, there exists a method for deciding an adding way according to a neural network.

Further, in this embodiment, the bone portion is referred to as an image area detecting radiation transmitting the bone of the subject 5 and the soft tissue portion is referred to as an image area detecting radiation transmitting a tissue and an internal organ excluding the bone of the subject 5. Generally, the transmission amount of radiation in the bone portion is little and the transmission amount of radiation in the soft tissue portion is much, though the values are smaller than the transmission amount of radiation in an area free of a subject (the so-called Radiation-free area).

(3) Creation of Weight Image

The weight image creating processing executed at Step S3 shown in FIG. 2 will be explained.

The weight image creating section 130 performs the binary coding processing for the image data including the bone portion detected by the important area detecting section 120 and creates a weight image having a predetermined weight, for example, each pixel value of 1 of the bone portion and each pixel value of 0 of other than the bone portion. Further, when the important area is a soft tissue portion, it creates a weight image having each pixel value of 1 of the soft tissue portion and each pixel value of 0 of other than the soft tissue portion.

Figure 2:
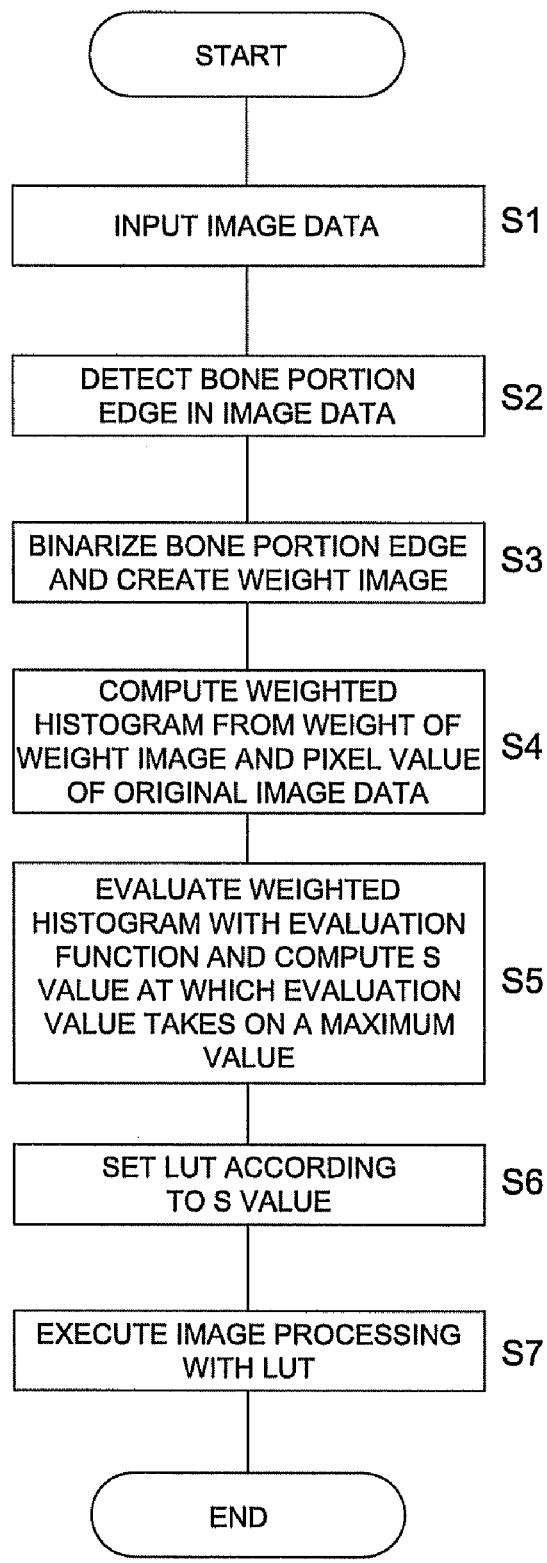
FIG. 2 is a flow chart showing the flow of the overall processing of an embodiment of the present invention.
Figure 3:
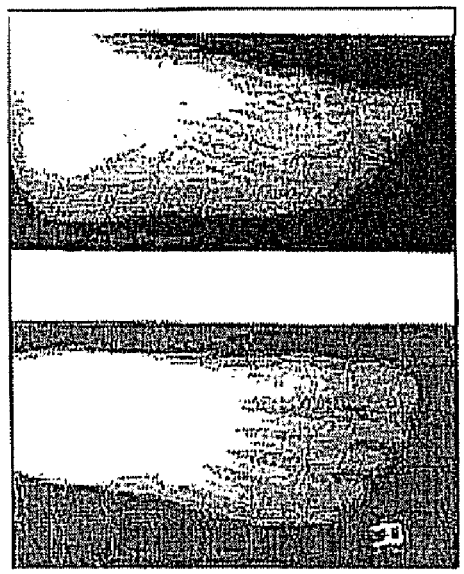
FIGS. 3(*a*) and 3(*b*) are illustrations showing the situation of the processing of the embodiment of the present invention.
Figure 3:
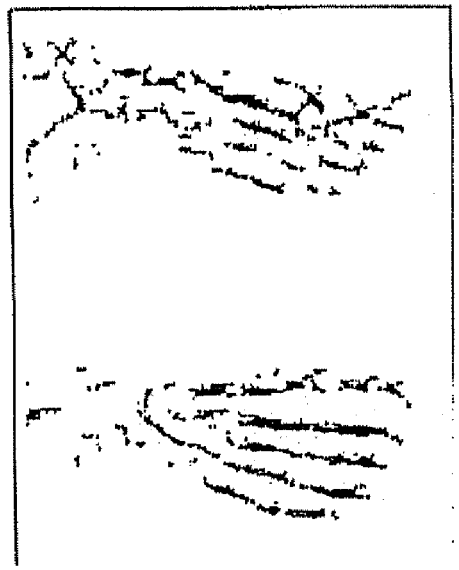

FIG. 3(*a*) is an original Radiation image inputted at Step S2 shown in FIG. 2. FIG. 3(*b*) shows the situation when at Step S3 shown in FIG. 2, the weight image creating section 130 performs the binary coding processing for the image data including the bone portion detected by the important area detecting section 120 and creates a weight image having a pixel value of 1 of the bone portion and a pixel value of 0 of other than the bone portion.

Further, to determine a final weight image from a plurality of characteristic values, the method by the neural network can be used. In this case, as a teacher image, an image divided into the bone portion, soft tissue portion, r-free area, and irradiation field is provided beforehand and is optimized by the reverse error propagation method.

(4) Computing of Histogram

The histogram computing processing executed at Step S4 shown in FIG. 2 will be explained.

The histogram computing section 140, for each pixel, obtains results of multiplication obtained by multiplying the weight of the weight image created at Step S3 by each pixel value of the radiation image which is read at Step S2 and corresponds to the weight image and computes a weighted histogram of the values of the results of multiplication and appearance frequency. Further, in the weighted histogram, there are possibilities that the part lower than a predetermined appearance frequency may be a noise part, so that it may be removed.

FIG. 4(a) shows an example when a weighted histogram using the weight image in which the bone portion is an important area as shown in FIG. 3(b) is created. Here, within the range of the pixel value equivalent to the bone portion, the appearance frequency is high.

(5) Computing of Importance

The importance computing processing executed at Step S5 shown in FIG. 2 will be explained.

The evaluating section 150 evaluates the aforementioned weighted histogram by a predetermined evaluation function (characteristic value evaluation function) and computes an evaluation result and a shift value (S value) at which the evaluation result takes on a maximum value.

Here, the evaluation function will be explained.

Generally, when a radiation image is outputted so as to set the image density in the bone portion area to 1.0 or so, a satisfactory image is obtained often. To realize it, for example, a method for performing an image processing so as to extract the bone portion area from the inside of the image and output the image by setting the average of the pixel values composing the bone portion area at a density close to 1.0 as mentioned above may be considered.

However, even if it is intended to extract precisely only the bone portion area from the image, various difficulties are caused, and actually, other areas than the bone portion are included ordinarily to a certain extent. Further, if it is intended to exclude the other areas, the possibility of excluding also the bone portion area necessary for the image processing is increased and there are possibilities that the image processing result may be greatly separated from a desired processing result.

Therefore, to give priority to the robustness of the image processing, this embodiment permits the area of an image which is a standard of the image processing to include, to a certain extent, an area other than the bone portion area, that is, other than the important area and extracts selectively the bone portion area. And, this embodiment, using the histogram obtained from the extracted image and the evaluation function, gives a determining method for an image processing condition (for example, an LUT (lookup table) slide amount) of high robustness.

Regarding the evaluation function, from the extraction method of the important area (method for extracting the bone portion area from the image) and the part to be diagnosed, various forms may be considered, though it can be given as indicated below.

FIGS. 10(a) to 10(d), when using the axis of abscissa as a pixel value x, show drawings showing evaluation values computed by various evaluation functions. The sigmoid function f1 (FIG. 10(a)), normal distribution f2 (FIG. 10(b)), and evaluation function f3 (FIG. 10(c)) are expressed respectively by the formulas indicated below.

$$f1 = \frac{1}{1+e^{-\left(\frac{2x-a}{150}\right)}}$$ Formula 1

$$f2 = c \cdot e^{\frac{-(x-k)^2}{t^2}}$$ Formula 2

$$f3 = u \cdot e^{\frac{-(x-s)^2}{t^2}}$$ Formula 3

Here, a, b, c, s, t, u, and k are constants (parameters). Using f1, f2, and f3 mentioned above:

$$f = a1 \cdot f1(a2 \cdot f2 + a3 \cdot f3)$$ Formula 4

The evaluation function mentioned above may be considered.

Figure 10:
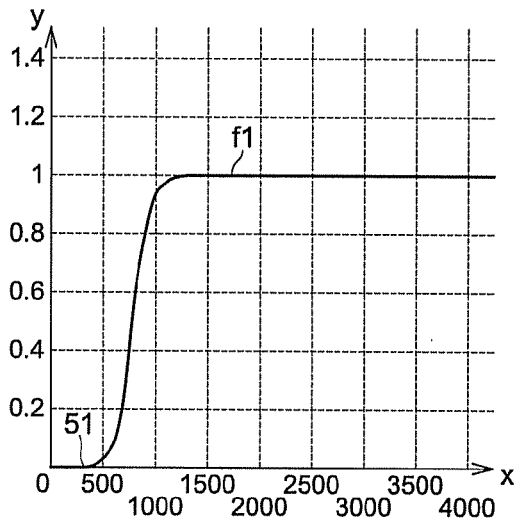
FIGS. 10(a) to 10(d) are drawings showing examples of the evaluation function of the embodiment of the present invention.
Figure 10:
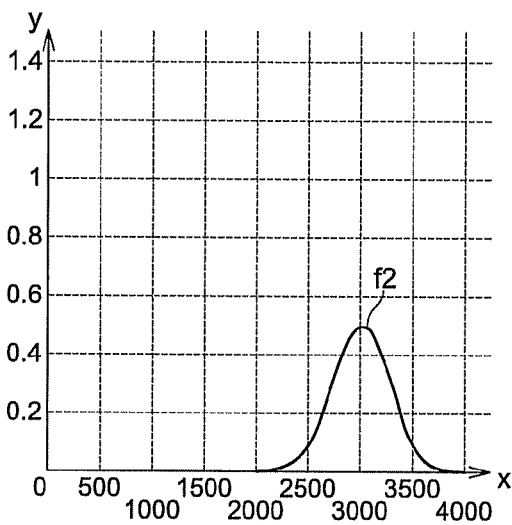
Figure 10:
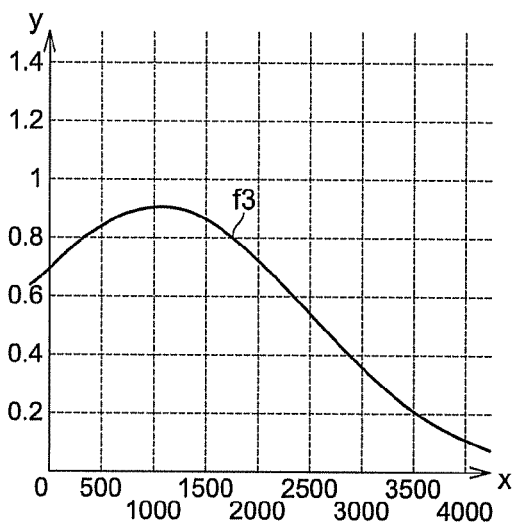
Figure 10:
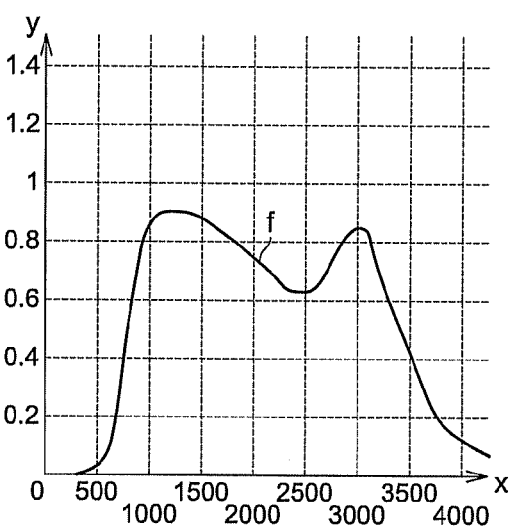

For example, when only the bone portion area can be extracted comparatively easily and correctly, assuming a3 as 0, only a single-peaked normal distribution is obtained, so that an evaluation function with the parameter of the evaluation function shown in FIG. 10(b) changed can be obtained.

Further, assuming a1, a2, and a3 as 1 and using suited parameters, for example, the parameters indicated below, the evaluation characteristic of the evaluation function as shown in FIG. 10(d) can be obtained.

a=1500
b=400
c=0.5
s=1000
t=2000
u=0.9
k=3000

These parameters, for example, can be determined by trial and error by observing the image inputted at Step S2. For example, when the ratio of an image at a low density (little transmitted radiological dosage) is high, an intercept 51 of f1 is adjusted, and the evaluation value at a low pixel value is reduced to a very small value, thus a parameter can be determined so as to prevent the image density after the gradation processing from a low density.

Further, the parameters can be determined so as to approach a predetermined target image. When approaching the target image, a sample image adjusted within the image density range suited to diagnosis is provided, and a method for (1) changing the parameter values within predetermined ranges, (2) computing an average density difference between a processed image at the respective changed parameter values and the sample image, and (3) regarding the parameter values for minimizing the concerned average density difference as optimum values may be used. Here, the average density difference is obtained, for the sample image and processed images which are image-processed at the respective parameter values, by computing mean values of signal values of all the images or image densities corresponding to the signal values and taking an absolute value of the difference between the computed mean values.

Here, FIG. 4(b) shows an example of the characteristic of the center emphasis evaluation function. The center emphasis evaluation function is characterized in that the maximum value of the evaluation value at the central part C is 1.0 and the evaluation value is lowered slowly on the left and right peripheral sides. And, the evaluation function is structured so as to be shifted left or right depending on the position of the pixel value where the central value B of the evaluation function is set.

Here, the evaluating section 150 obtains an evaluation result by positioning the central value of the evaluation function at the position of a certain pixel value and multiplying the evaluation value of the evaluation function by the appearance frequency of the weighted histogram. And, the evaluating section 150 shifts the evaluation function by a predetermined amount, puts the central value of the evaluation function at the position of another pixel value, and obtains an evaluation result by multiplying the evaluation value of the evaluation function by the appearance frequency of the weighted histogram. By doing this, the evaluating section 150, as shown in fa, fb, fc, and fd in FIG. 4(c), shifts the central value of the evaluation function and obtains a plurality of evaluation results.

Here, the evaluating section 150 computes a shift value at which the evaluation value is maximized as a shift value (S value) on the basis of a predetermined pixel value (for example, a pixel value of 0). Further, in the evaluation by this evaluation function, although depending on the shape of the frequency of the important area of the weighted histogram, when the peak portion of the appearance frequency of the weighted histogram almost coincides with the central part of the evaluation function, the evaluation value is maximized. Namely, the pixel value E at the peak of the appearance frequency of the weighted histogram almost corresponds to the shift value from the pixel value 0.

Further, when evaluating the bone portion by the evaluation function, the evaluation function is shifted within the range of the pixel value equivalent to density between 0.5 and 1.5. Therefore, when the shift is outside the range, the processing is interrupted in consideration of an occurrence of any error.

Further, when evaluating the soft tissue portion by the evaluation function, the evaluation function is shifted within the range of the pixel value equivalent to density between 1.5 and 2.5. Therefore, when the shift is outside the range, the processing is interrupted in consideration of an occurrence of any error.

(6) Setting of Image Processing Condition

The setting processing of the image processing condition executed at Step S6 shown in FIG. 2 will be explained.

The image processing condition determining section 160, so as to obtain a predetermined processing result by performing the image processing for the pixel value of the image data corresponding to the maximum value of the evaluation function for obtaining the above shift value, determines the image processing condition of the gradation processing.

When the image processing is a gradation processing, the image processing condition determining section 160 determines the image processing condition for obtaining desired signal values (density value, brightness value) by performing the image processing for the pixel value corresponding to the shift value aforementioned and decides an LUT for the gradation processing according to the image processing condition.

For example, as shown in FIG. 4(d), the image processing condition determining section 160 determines the image processing condition for density D1 (=1.0) from the pixel value (pixel value at the peak of appearance frequency in the bone portion area) corresponding to the shift value computed by the processing at Step S5 and decides an LUT of the characteristic conforming to the image processing condition.

When extracting and outputting the bone portion area as an important area, it is preferable, when it is outputted at a maximum density of 3.0, to perform the image processing so as to obtain density of 0.7 to 1.3 at the pixel value corresponding to the shift value. Further, regarding the brightness display on the display unit, it is preferable to perform the image processing so as to output the bone portion at a maximum brightness of 60 to 80% at the pixel value corresponding to the shift value.

Further, when extracting and outputting the soft tissue portion area, it is preferable, when it is outputted at a maximum density of 3.0, to perform the image processing so as to obtain density of 1.5 to 2.5 at the pixel value corresponding to the shift value. Further, regarding the brightness display on the display unit, it is preferable to perform the image processing so as to output the soft tissue portion at a maximum brightness of 15 to 50% at the pixel value corresponding to the shift value.

(7) Image Processing

The image processing executed at Step S7 shown in FIG. 2 will be explained.

The image processing section 170, for the image data from the image data creating section 110, according to the image processing condition (parameters) determined by the image processing condition determining section 160 by the processings at Steps S1 to S6, executes the image processing.

Concretely, for example, in the gradation processing, the LUT decided according to the shift value determined by the aforementioned evaluation function is used and each pixel of the image data is converted by the LUT. By doing this, the processed image becomes an image converted so as to set the given evaluation function, that is, in the example aforementioned, the important area after conversion to a desired density value or brightness value. Further, the frequency emphasizing processing and equalization processing are performed similarly by an emphasis parameter or a correction parameter which are determined by the evaluation function as mentioned above. The processed image data is fed to an image display section, various external devices, and an image output apparatus which are not drawn.

Effects Obtained by Embodiment

As mentioned above, in this embodiment, the pixels of the important area included in the radiation image are weighted as predetermined, thus a weighted histogram is computed, and a shift value at which the evaluation result for the weighed histogram evaluated by a predetermined evaluation function is maximized is computed, and so as to obtain a predetermined processing result from the pixel value of the radiation image corresponding to the maximum value of the evaluation function for obtaining this shift value, the image processing condition is determined, so that the predetermined processing result is obtained in the important area, and there is no need to set an exclusive region of interest (ROI) in the region of interest setting system, and an image processing having high robustness under an appropriate condition can be executed.

Second Embodiment

The weighted histogram shown in FIG. 4(a) is an example when a weighted histogram is created in a weight image having the bone portion as an important area as shown in FIG. 3(b), though actually, the effect of the irradiation field may appear in the weighted histogram.

Figure 5:
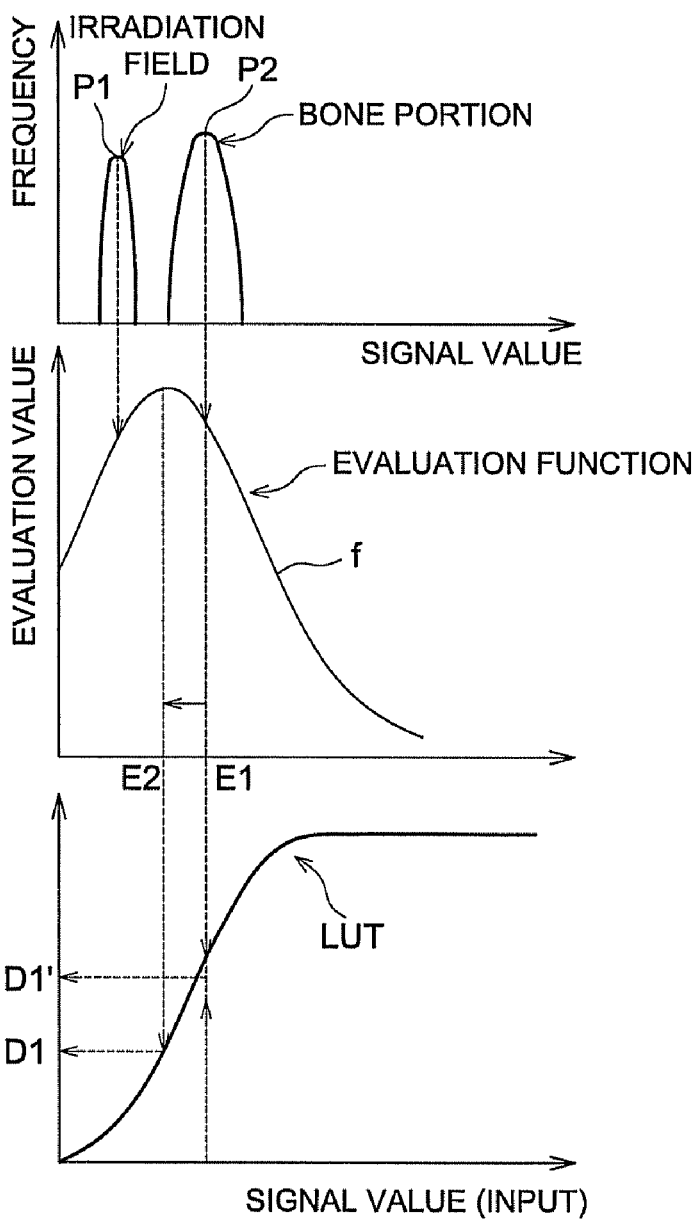
FIGS. 5(a) to 5(c) are illustrations showing the situation of the processing of the embodiment of the present invention.

The weighted histogram shown in FIG. 5(a) shows an example when a weighted histogram is created in a weight image having the bone portion as an important area and showing the effect of the irradiation field. Here, at the pixel value smaller than that of the bone portion, the pixels in the irradiation field appear at high frequency.

In such a case, when the weighted histogram is evaluated by the same center emphasis evaluation function as that shown in FIG. 4(b) so as to maximize the evaluation value, as shown in FIG. 5(b), a state that at the middle part between the peak P1 of the irradiation field and the peak P2 of the bone portion, both peaks extend almost evenly over the portion of the evaluation function f which is almost a peak thereof is obtained.

Therefore, in this state, when the shift value at which the evaluation value is maximized is computed as a shift value (S value), the pixel value E1 of the peak P2 of the appearance frequency of the bone portion of the weighted histogram does not coincide with the shift value of the evaluation function, is affected by the appearance frequency of the irradiation field, thereby becomes a slightly small shift value (E2).

As a result, the image processing condition determining section 160 determines an image processing condition under which the predetermined density D1 (−1.0) is obtained at the above shift value and decides an LUT of the characteristic corresponding with the image processing condition (FIG.

5(*c*)). In this case, the shift value is small, so that the characteristic of the LUT is moved to the left, and the pixel value of the bone portion is converted to larger density D1' than the predetermined density D1. Namely, a state that the predetermined processing result cannot be obtained in the original important area is set.

Figure 6:
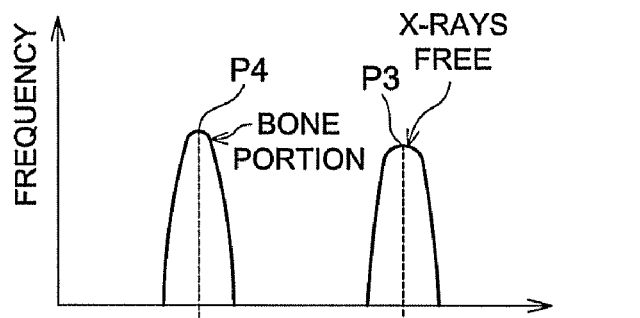
FIGS. 6(a) to 6(c) are illustrations showing the situation of the processing of the embodiment of the present invention.
Figure 6:
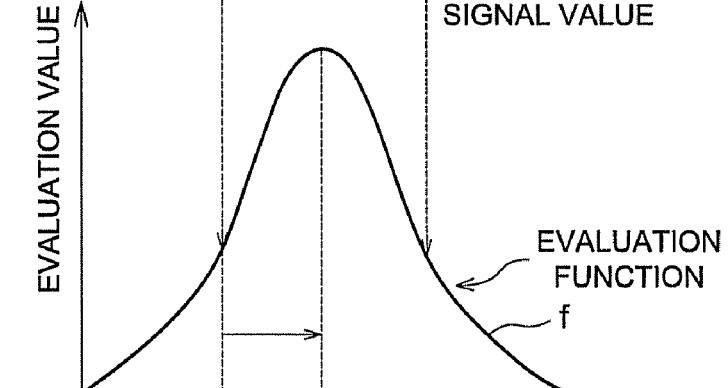
Figure 6:
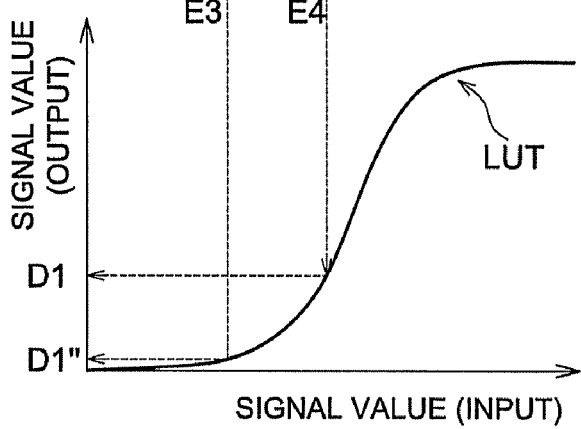

On the other hand, the weighted histogram shown in FIG. 6(*a*) is an example when for the weight image in which the bone portion is set as an important area and an influence of radiation-free is produced, the weighted histogram is created. Here, at the pixel value larger than that of the bone portion, the Radiation-free pixels appear at high frequency.

Figure 4:
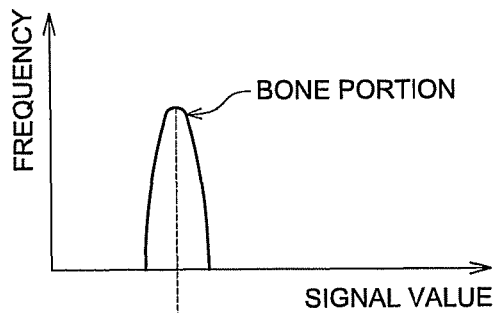
FIGS. 4(a) to 4(d) are illustrations showing the situation of the processing of the embodiment of the present invention.
Figure 4:
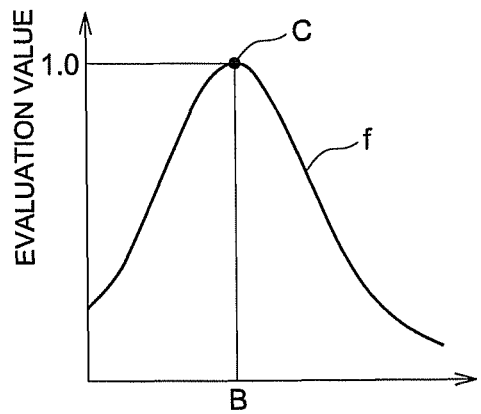
Figure 4:
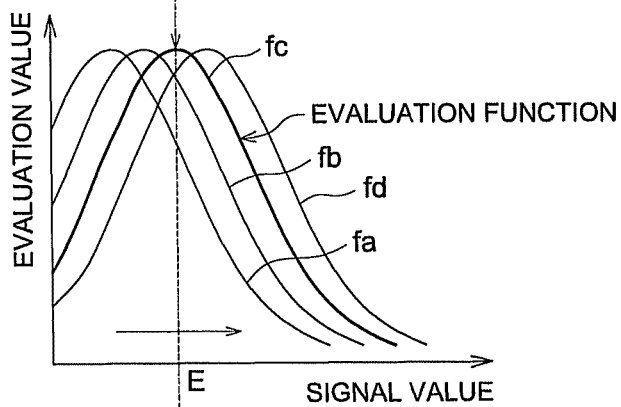
Figure 4:
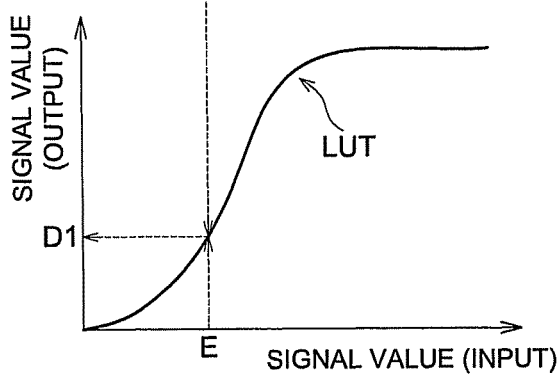

In such a case, when the weighted histogram is evaluated by the same center emphasis evaluation function as that shown in FIG. 4(*b*) so as to maximize the evaluation value, as shown in FIG. 6(*b*), a state that at the middle part between the radiation-free peak P3 and the peak P4 of the bone portion, both peaks extend almost evenly over the portion of the evaluation function f which is almost a peak thereof is obtained.

Therefore, in this state, when the shift value at which the evaluation value is maximized is computed as a shift value (S value), the pixel value E3 of the peak P4 of the appearance frequency of the bone portion of the weighted histogram does not coincide with the shift value E4 of the evaluation function f, is affected by the radiation-free appearance frequency, thereby becomes a large shift value (FIG. 6(*b*)).

As a result, the image processing condition determining section 160 determines an image processing condition under which the predetermined density D1 (=1.0) is obtained at the above shift value and decides an LUT of the characteristic corresponding with the image processing condition (FIG. 6(*c*)). In this case, the shift value is large, so that the characteristic of the LUT is moved to the right, and the pixel value of the bone portion is converted to smaller density D1" than the predetermined density D1. Namely, a state that the predetermined processing result cannot be obtained in the original important area is set.

Therefore, instead of the center emphasis evaluation function shown in FIGS. 4(*a*) to 4(*d*), it is desirable to use an evaluation function modified as indicated below.

(a) Bone Portion and Irradiation Field

A characteristic of a shape is set that the maximum value C2 of the evaluation characteristic of the evaluation function is provided within the range of the pixel value of the important area (bone portion) included in the radiation image and in the neighborhood of the pixel value E5 at which the evaluation characteristic is maximized and as compared with the area of a pixel value larger than the concerned pixel value, in the neighborhood of the pixel value at which the evaluation characteristic is maximized, and in the area (in the neighborhood of the pixel value in the irradiation field) E7 of a smaller pixel value than the concerned pixel value, the evaluation characteristic has a gentle slope.

Figure 7:
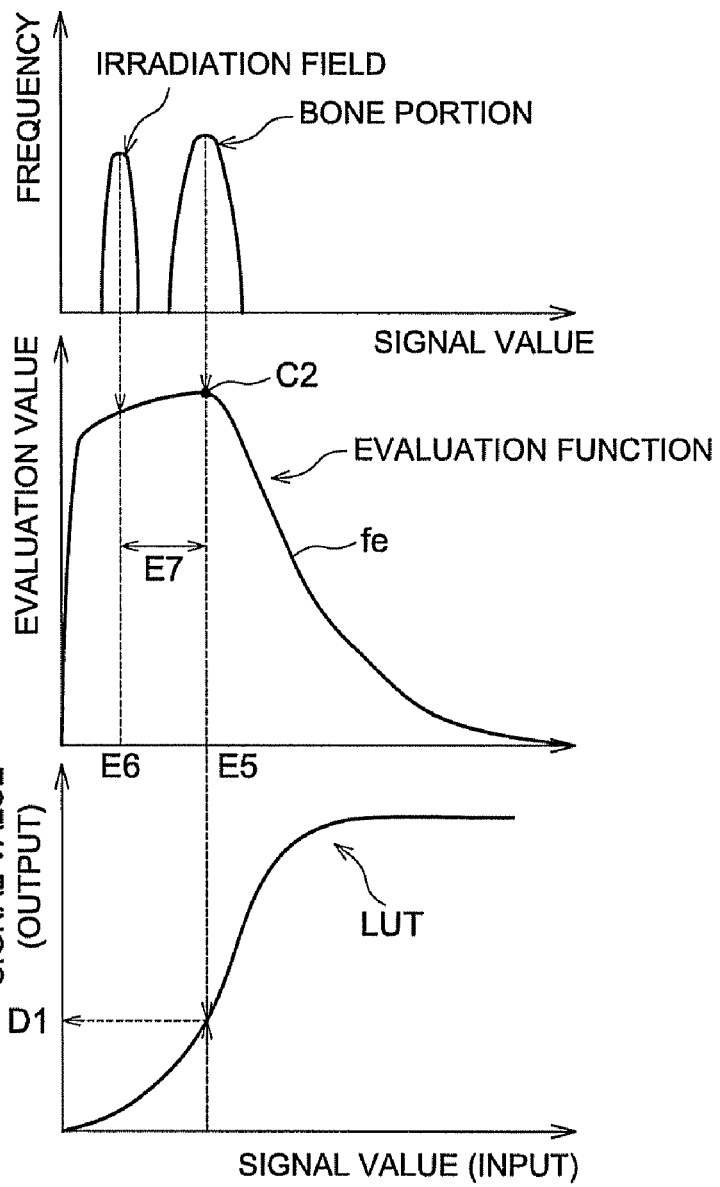
FIGS. 7(a) to 7(c) are illustrations showing the situation of the processing of the embodiment of the present invention.

The shape of the evaluation function is shown in FIG. 7(*b*).

When the evaluation function fe is formed in such a shape, the shift value E5 of the evaluation function will not be shifted due to the irradiation field. Further, even if there is no irradiation field in the histogram, the shift value of the evaluation function will not be shifted (FIG. 7(*c*)).

(b) Bone Portion and Free of Radiation

A characteristic of a shape is set that the maximum value C3 of the evaluation characteristic of the evaluation function is provided within the range of the pixel value of the important area (bone portion) included in the radiation image and the part of the concerned evaluation characteristic which is another peak C4 thereof is provided in the area (in the neighborhood of the pixel value due to free of radiation) E9 of a larger pixel value than the pixel value of the bone portion.

The shape of the evaluation function is shown in FIG. 8(*b*).

When the evaluation function fe is formed in such a shape, the shift value E8 of the evaluation function will not be shifted due to free of radiation. Further, even if there is no free of radiation in the histogram, the shift value of the evaluation function will not be shifted (FIG. 8(*c*)).

(c) Bone Portion, Irradiation Field, and Free of Radiation

A characteristic of a shape is set that the maximum value C5 of the evaluation characteristic of the evaluation function is provided within the range of the pixel value of the important area (bone portion) included in the radiation image and in the neighborhood of the pixel value E11 at which the evaluation characteristic is maximized and as compared with the area of a pixel value larger than the concerned pixel value, in the neighborhood of the pixel value at which the evaluation characteristic is maximized, and in the area (in the neighborhood of the pixel value in the irradiation field) E12 of a smaller pixel value than the concerned pixel value, the evaluation characteristic has a gentle slope and furthermore, a characteristic of a shape is set that the part of the concerned evaluation characteristic which is another peak C6 thereof is provided in the area (in the neighborhood of the pixel value due to free of radiation) E13 of a larger pixel value than the pixel value of the bone portion.

Figure 9:
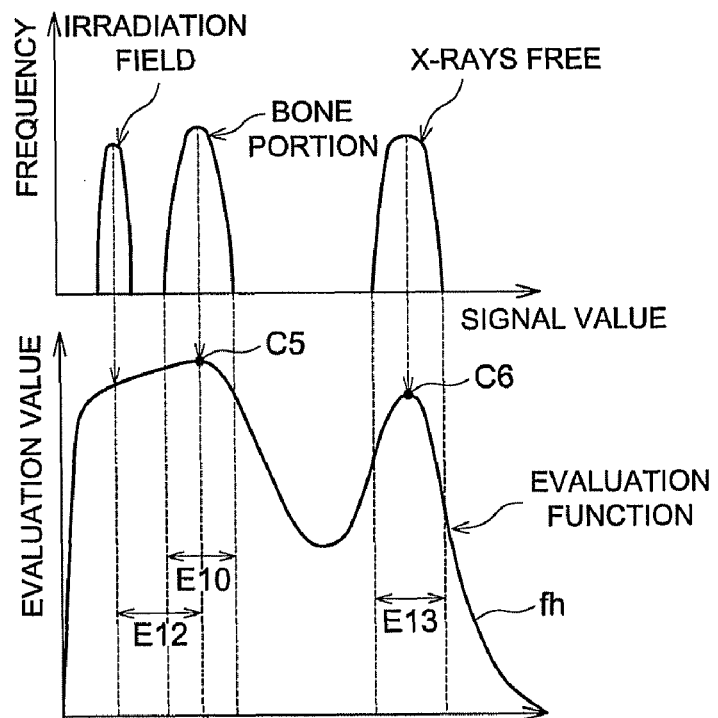
FIGS. 9(a) to 9(c) are illustrations showing the situation of the processing of the embodiment of the present invention.

The shape of the evaluation function is shown in FIG. 9(*b*).

When the evaluation function fh is formed in such a shape, the shift value E11 of the evaluation function will not be shifted due to the irradiation field. Further, even if there is no irradiation field in the histogram, the shift value of the evaluation function will not be shifted (FIG. 9(*c*)). And, when the evaluation function is formed in such a shape, the shift value of the evaluation function will not be shifted due to free of radiation. Further, even if there is no free of radiation in the histogram, the shift value of the evaluation function will not be shifted (FIG. 9(*c*)).

Namely, the predetermined processing result is obtained in the important area (bone portion), and there is no need to set an exclusive region of interest (ROI) in the region of interest setting system, and an image processing having high robustness under an appropriate condition can be executed.

(d) Bone Portion, Irradiation Field, or Other than Free of Radiation

When an area of a high appearance frequency is generated in the histogram under any influence other than the irradiation field or free of radiation which are aforementioned, if an evaluation function in a shape in accordance with the pixel value thereof is set, satisfactory results similar to those of the items of (a), (b), and (c) can be obtained.

Other Embodiments

In the embodiments aforementioned, the bone portion is set as an important area and the concrete examples are explained, though by application of the embodiments, in other important areas such as the soft tissue portion tissue, a desired image processing can be executed.

What is claimed is:

1. An image processing method for performing an image processing to obtain an image suitable for diagnosis for a radiation image having a signal according to an irradiation dose of radiation that is transmitted through a subject, the image processing method comprising:
   detecting a bone portion or a soft tissue portion included in the radiation image as an important area;
   creating a weight image for imparting a predetermined weight to pixels of the important area;
   creating a weighted histogram by multiplying the weight of the weight image by a pixel value of the radiation image and computing the weighted histogram from results of the multiplication;

evaluating the weighted histogram with a predetermined evaluation function and computing a shift value at which an evaluation result takes on a maximum value;

determining an image processing condition so as to obtain a predetermined processing result from the pixel value of the radiation image corresponding to a maximum value of the evaluation function for obtaining the shift value; and executing the image processing under the determined image processing condition.

2. The image processing method according to claim 1, wherein a gradation processing is executed as the image processing.

3. The image processing method according to claim 1, wherein a maximum value of an evaluation characteristic of the evaluation function is within a range of a pixel value of the bone portion included in the radiation image.

4. The image processing method according to claim 1, wherein a maximum value of an evaluation characteristic of the evaluation function is within a range of a pixel value of the bone portion included in the radiation image and a part of the evaluation characteristic which is another peak thereof is at a pixel value larger than the pixel value of the bone portion.

5. The image processing method according to claim 1, wherein, a maximum value of an evaluation characteristic of the evaluation function is within a range of a pixel value of a bone portion included in the radiation image and, compared with an area in a neighborhood of the pixel value which is the maximum value of the evaluation characteristic, having a pixel value larger than the pixel value, in an area in a neighborhood of the pixel value which is the maximum value of the evaluation characteristic, having a pixel value smaller than the pixel value, the evaluation characteristic has a gentle slope.

6. The image processing method according to claim 1, wherein, a maximum value of an evaluation characteristic of the evaluation function is within a range of a pixel value of a bone portion included in the radiation image, a part of the evaluation characteristic which is another peak thereof has a pixel value larger than the pixel value of the bone portion, and compared with an area in a neighborhood of the pixel value which is the maximum value of the evaluation characteristic, having a pixel value larger than the pixel value, in an area in a neighborhood of the pixel value which is the maximum value of the evaluation characteristic, having a pixel value smaller than the pixel value, the evaluation characteristic has a gentle slope.

7. The image processing method according to claim 1, wherein a maximum value of an evaluation characteristic of the evaluation function is within a range of a pixel value of a soft tissue portion included in the radiation image.

8. An image processor for performing an image processing to obtain an image suitable for diagnosis for a radiation image having a signal according to an irradiation dose of radiation that is transmitted through a subject, the image processor comprising:

an important area detecting section for detecting a bone portion or a soft tissue portion included in the radiation image as an important area, a weight image creating section for creating a weight image for imparting a predetermined weight to pixels of the important area, a histogram computing section for multiplying a weight of the weight image by a pixel value of the radiation image and computing a weighted histogram from results of multiplication, an evaluating section for evaluating the weighted histogram with a predetermined evaluation function and computing a shift value at which an evaluation result takes on a maximum value, an image processing condition determining section for determining an image processing condition so as to obtain a predetermined processing result from the pixel value of the radiation image corresponding to the maximum value of the evaluation function for obtaining the shift value, and an image processing section for executing the image processing under the image processing condition.

9. The image processor according to claim 8, wherein the image processing section executes a gradation processing as an image processing.

10. The image processor according to claim 8, wherein the maximum value of the evaluation characteristic of the evaluation function is within a range of a pixel value of the bone portion included in the radiation image.

11. The image processor according to claim 8, wherein the maximum value of the evaluation characteristic of the evaluation function is within a range of a pixel value of the bone portion included in the radiation image and a part of the evaluation characteristic which is another peak thereof has a pixel value larger than the pixel value of the bone portion.

12. The image processor according to claim 8, wherein:

a maximum value of an evaluation characteristic of the evaluation function is within a range of a pixel value of the bone portion included in the radiation image and compared with an area in a neighborhood of the pixel value which is the maximum value of the evaluation characteristic, having a pixel value larger than the pixel value, in an area in a neighborhood of the pixel value which is the maximum value of the evaluation characteristic, having a pixel value smaller than the pixel value, the evaluation characteristic has a gentle slope.

13. The image processor according to claim 8, wherein a maximum value of an evaluation characteristic of the evaluation function is within a range of a pixel value of a bone portion included in the radiation image, a part of the evaluation characteristic which is another peak thereof has a pixel value larger than the pixel value of the bone portion, and compared with an area in a neighborhood of the pixel value which is the maximum value of the evaluation characteristic, having a pixel value larger than the pixel value, in an area in a neighborhood of the pixel value which is the maximum value of the evaluation characteristic, having a pixel value smaller than the pixel value, the evaluation characteristic has a gentle slope.

14. The image processor according to claim 8, wherein a maximum value of the evaluation characteristic of the evaluation function is within a range of a pixel value of a soft tissue portion included in the radiation image.

* * * * *